Jan. 3, 1939.　　　　　E. E. HEWITT　　　　　2,142,190
BRAKE CYLINDER
Filed March 4, 1937
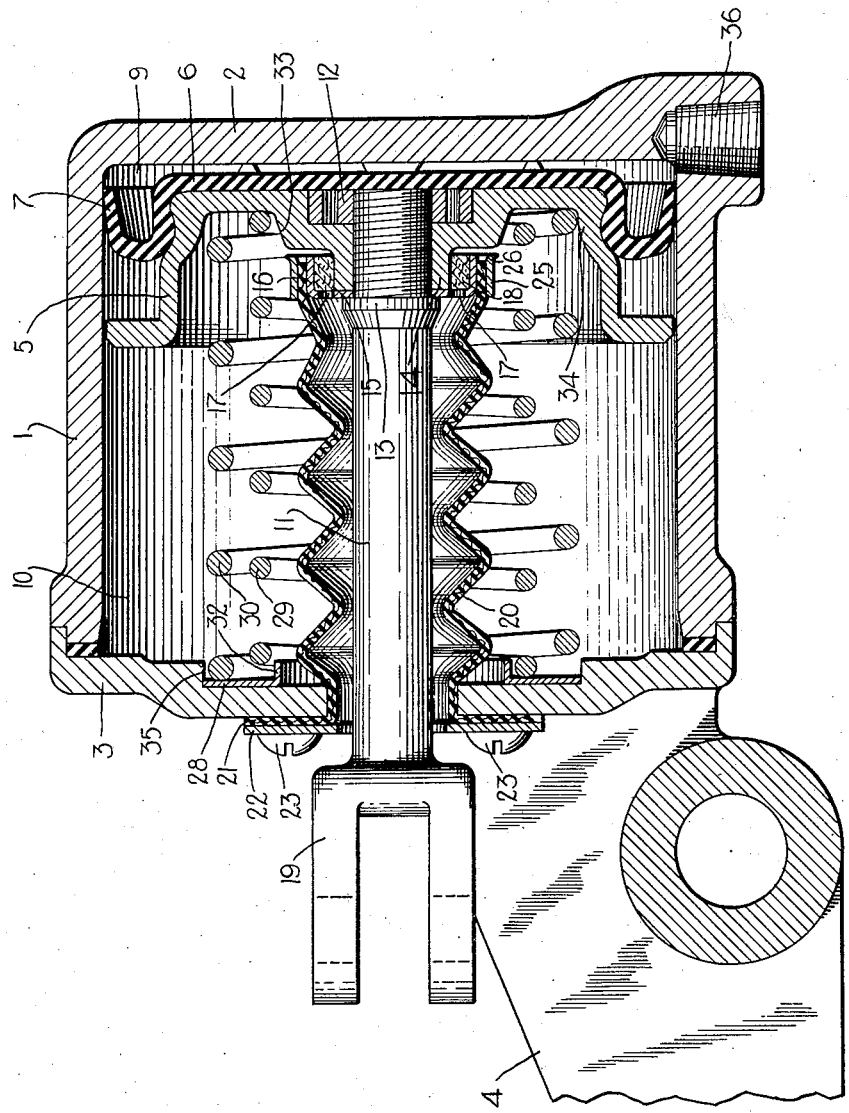
INVENTOR
ELLIS E. HEWITT
BY *Wm. M. Cady*
ATTORNEY Patented Jan. 3, 1939

2,142,190

UNITED STATES PATENT OFFICE 2,142,190

BRAKE CYLINDER

Ellis E. Hewitt, Edgewood, Pa., assignor to The Westinghouse Air Brake Company, Wilmerding, Pa., a corporation of Pennsylvania Application March 4, 1937, Serial No. 128,926

9 Claims. (Cl. 303—88)

This invention relates to brake cylinders such as employed in railway rolling stock or in automotive vehicles in connection with fluid pressure brake systems.

The principal object of the invention is to provide a brake cylinder having improved means for preventing water, snow and dirt or other foreign matter from entering the non-pressure chamber of the brake cylinder.

Other objects and advantages will appear in the following more detailed description of the invention.

As shown in the accompanying drawing the single figure is a longitudinal sectional view of a brake cylinder embodying the invention, a portion of the frame of a vehicle being shown in supporting relationship with the brake cylinder. The brake cylinder shown in the drawing for illustrative purposes is of the type especially adapted for use on automotive vehicles and comprises a cylinder casing 1 having an integral pressure head 2 and a non-pressure head 3 which may be formed integral with a frame member 4 of the vehicle. The cylinder casing 1 is adapted to be secured to the non-pressure head 3 in any suitable manner.

Contained in the cylinder casing is a reciprocal piston comprising a head 5 and a packing member 6 which is preferably of a rubber composition and which is snapped on the head to cover the face thereof. The member 6 is provided with a peripheral skirt 7 which slidably engages the inner surface of the wall of the cylinder portion and forms the usual seal between a pressure chamber 9 at one side of the piston and a non-pressure chamber 10 at the other side of the piston.

The head 5 is provided with a central opening for the reception of the inner end portion of a piston rod 11, which end portion has screw threaded connection with the head within said opening. The threaded end of the piston rod 11 extends through the head 5 and the rod is locked against rotation relative the head by a jam nut 12 which is received in a recess in the face side of the head, said recess being of sufficient depth to insure the outer face of the jam nut being flush with the outer face of the head.

The piston rod 11 is provided with a collar 13 and surrounding the rod and interposed between the collar 13 and an annular boss 14 formed integral with the head 5 and surrounding the piston rod receiving opening, is an annular breather member 15 having an integral peripheral flange 16 which is spaced from the outer surface of the boss 14 and which extends inwardly beyond the outer end surface of the boss, that is to say, the flange overlies the boss. Adjacent the flange 16 the breather member 15 is provided with breather openings 17 which are in constant open communication with the space between the flange and the outer surface of the boss 14. When the piston rod is screwed into the head 5, the breather member is rigidly clamped between the shoulder 13 of the piston rod and the annular boss 14 of the piston head.

Packed in the space between the flange 16 and the breather member 15 and the outer surface of the boss 14 is a mass of straining material 18 which may comprise curled hair or which, as shown in the drawing, may comprise an annular piece of felt or any other suitable straining material.

The piston rod 11 extends through a central opening in the non-pressure head 3 and beyond this head is provided with a jaw 19 for connection in the usual manner to the brake rigging not shown.

Surrounding the piston rod 11 is a longitudinally extending boot 20 which is preferably made of a rubber composition and which is of bellows form throughout the major portion of its length.

The outer end of this boot extends through the central opening in the non-pressure head and is provided with an outwardly extending annular flange 21 which is clamped to the outer face of the non-pressure head by a plate 22 which is secured to the head by machine screws 23. This plate is provided with a central opening 24 to accommodate the piston rod 11.

The inner end of the boot is slipped over the peripheral flange 16 of the breather member and is firmly clamped to such flange by a clamping ring 25 which is pressed over the extreme end portion of the boot, the inner edge of the ring being flared outwardly slightly to provide a rounded edge 26 to insure against cutting of the boot when the clamping ring is being forced to its clamping position.

Contained in the non-pressure chamber 10 and interposed between and operatively engaging an inner face of the piston head 5 and the inner surface of a spring seat 27 contained in a recess 28 formed in the non-pressure head, are inner and outer concentrically arranged release coil springs 29 and 30, respectively, which surround the boot 20, the spring 29 being of great enough diameter to insure against the boot contacting therewith when the boot is being collapsed endwise by the piston in applying the brakes. The depth of the recess 28 is greater than the thickness of the spring seat so as to provide a circular shoulder 35.

The spring 29 is maintained centralized by its engagement at one end with an inwardly extending annular flange 32 with which the spring seat 27 is provided and by its engagement at the opposite end with an annular boss 33 on the piston head 5. The spring 30 is maintained centralized by its engagement at one end with the annular side wall 34 of the piston head and by its engagement at the opposite end with the shoulder 35 on the non-pressure head.

In operation when fluid under pressure is supplied to the piston chamber 9 by way of brake cylinder passage 36 the piston is caused to move outwardly and as it moves folds the boot 20 and tends to compress the fluid contained in the non-pressure chamber 10. As the piston is thus moving fluid in the chamber 10 escapes to the atmosphere by way of the strainer 18, openings 17 in the strainer member 15 and the interior of the boot 20 which is open to the atmosphere by way of the opening in the clamping plate 22.

When fluid under pressure is released from the piston chamber 9 the release springs 29 and 30 act to return the piston to its normal position as shown in the drawing. As the piston is thus being moved, fluid is drawn into the non-pressure chamber 10 by way of the opening in the clamping plate 22, interior of the boot 20, openings 17 and strainer 18, the strainer cleaning the air of foreign matter before it enters the chamber 10.

Since the straining material is carried by the piston it will at all times be contained in the chamber 10 where it will not be directly subjected to dust, mud, slush or other foreign matter to which the brake cylinder is subjected and which would tend to clog the breather communication. This arrangement is made possible by the use of the boot 20 which forms an always open communication between the atmosphere and the straining material.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake cylinder having a reciprocal piston and a non-pressure chamber at one side of the piston, in combination, a flexible breather conduit through which air is adapted to flow to or from said chamber, and means interposed in said conduit and movable by said piston adapted to remove foreign matter from air flowing through said conduit toward said chamber.

2. In a brake cylinder having a reciprocal piston and a non-pressure chamber at one side of the piston, in combination, a flexible breather conduit through which air is adapted to flow to or from said chamber, air straining means interposed in said conduit and carried by said piston adapted to remove foreign matter from air flowing through said conduit toward said chamber, and means securing said conduit to said air straining means.

3. In a brake cylinder having a reciprocal piston and a non-pressure chamber at one side of the piston, in combination, a flexible breather conduit through which air is adapted to flow to or from said chamber, air straining means interposed in said conduit and carried by said piston adapted to remove foreign matter from air flowing through said conduit toward said chamber, said air straining means comprising a strainer retaining member secured to the piston and straining material carried by said member, and means clamping said conduit to said member.

4. In a brake cylinder having a reciprocal piston and a non-pressure chamber at one side of the piston, in combination, a flexible breather conduit through which air is adapted to flow to or from said chamber, air straining means interposed in said conduit and carried by said piston adapted to remove foreign matter from air flowing through said conduit toward said chamber, said air straining means comprising an annular retaining member secured to the piston and having peripheral retaining flange which is spaced away from said piston and straining material filling the space between said flange and piston, and means securing said conduit to said flange.

5. In a brake cylinder having a reciprocal piston and a non-pressure chamber at one side of the piston, in combination, a flexible breather conduit through which air is adapted to flow to or from said chamber, means movable by said piston adapted to remove foreign matter from air flowing through said conduit toward said chamber, a release spring for said piston surrounding said conduit and spaced therefrom, and means for maintaining said spring centralized.

6. In a brake cylinder having a reciprocal piston and a non-pressure chamber and a non-pressure head at one side of said piston, in combination, an air strainer device secured to said piston, and a flexible breather conduit secured at one end to said strainer device and secured at the other end to said non-pressure head, said strainer device and conduit forming an air conducting communication between said chamber and atmosphere.

7. In a brake cylinder having a reciprocal piston, a release coil spring for said piston, and a non-pressure chamber and a non-pressure head at one side of said piston, in combination, an air strainer device secured to said piston and a flexible breather conduit located centrally of the coils of said spring and being secured at one end to said strainer device and at the opposite end being secured to said non-pressure head, said strainer device and conduit forming an always open breather communication between said chamber and atmosphere.

8. In a brake cylinder having a reciprocal piston and a non-pressure head and a non-pressure chamber at one side of said piston, in combination, an air strainer device, a piston rod clamping said air strainer device to said piston, a flexible breather conduit surrounding said piston rod and being secured at one end to said strainer device and being secured at the other end to said non-pressure head, said strainer device and conduit forming an always open breather communication between said chamber and atmosphere.

9. In a brake cylinder having a reciprocal piston and a non-pressure head and a non-pressure chamber at one side of said piston, in combination, an air strainer device, a piston rod clamping said air strainer device to said piston, a flexible breather conduit surrounding said piston rod, said conduit at one end extending through a central opening in the non-pressure head to the exterior of the brake cylinder and secured to said head, and means for securing the other end of said conduit to said strainer device, said strainer device and conduit forming a breather communication between said chamber and atmosphere.

ELLIS E. HEWITT.